United States Patent
Suzuki et al.

(10) Patent No.: US 11,184,667 B2
(45) Date of Patent: *Nov. 23, 2021

(54) ELECTRONIC DEVICE

(71) Applicant: KABUSHIKI KAISHA TOSHIBA, Minato-ku (JP)

(72) Inventors: Nobuaki Suzuki, Ota (JP); Takashi Doi, Fuchu (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 49 days.

This patent is subject to a terminal disclaimer.

(21) Appl. No.: 16/809,631

(22) Filed: Mar. 5, 2020

(65) Prior Publication Data
US 2020/0296449 A1    Sep. 17, 2020

Related U.S. Application Data

(63) Continuation of application No. 16/556,448, filed on Aug. 30, 2019, now Pat. No. 10,631,041.

(30) Foreign Application Priority Data

Mar. 14, 2019  (JP) .............................. JP2019-047270

(51) Int. Cl.
*H04N 21/4363* (2011.01)
*H04N 5/44* (2011.01)

(52) U.S. Cl.
CPC ......... *H04N 21/43635* (2013.01); *H04N 5/44* (2013.01)

(58) Field of Classification Search
CPC ........................ H04N 21/43635; H04N 5/44
See application file for complete search history.

(56) References Cited

U.S. PATENT DOCUMENTS

| | | | |
|---|---|---|---|
| 8,615,156 B2 | 12/2013 | Glen | |
| 9,009,361 B2 * | 4/2015 | Kataoka | H04N 7/0117 710/14 |
| 9,305,516 B1 * | 4/2016 | Suzuki | H04N 21/43635 |
| 9,497,438 B2 | 11/2016 | Iwamura et al. | |
| 9,591,257 B2 * | 3/2017 | Oh | H04N 21/4122 |
| 9,819,995 B2 * | 11/2017 | Park | H04L 12/10 |
| 9,848,164 B2 * | 12/2017 | Suzuki | G09G 5/006 |
| 9,954,674 B2 * | 4/2018 | Kao | H04L 7/0075 |

(Continued)

FOREIGN PATENT DOCUMENTS

JP    2016-163238 A    9/2016

*Primary Examiner* — Brian P Yenke
(74) *Attorney, Agent, or Firm* — Oblon, McClelland, Maier & Neustadt, L.L.P.

(57) ABSTRACT

According to one embodiment, an electronic device includes a memory that stores a first EDID including an identification bit set to respond to a separate electronic device when the separate electronic device supports a first version of the HDMI, a transmitter that transmits the first EDID, and a receiver. When the receiver receives first control information including response information set in response to the identification bit, a compliant version of the HDMI to be operated is determined according to the response information. When the receiver does not receive the first control information, the compliant version of the HDMI to be operated is determined according to an attribute of a video and audio signal transmitted from the separate electronic device.

1 Claim, 8 Drawing Sheets

(56) References Cited

U.S. PATENT DOCUMENTS

| | | | |
|---|---|---|---|
| 10,032,434 B2* | 7/2018 | Yoon | H04N 21/4436 |
| 10,306,307 B2* | 5/2019 | Sanders | H04N 21/43635 |
| 10,319,336 B2* | 6/2019 | Oh | G09G 5/006 |
| 10,341,726 B2* | 7/2019 | Minemura | H04N 5/38 |
| 10,545,551 B2* | 1/2020 | Teramoto | H04N 21/43632 |
| 10,631,041 B1* | 4/2020 | Suzuki | G09G 5/006 |
| 10,701,284 B2* | 6/2020 | Marino | H04N 21/42203 |
| 10,916,217 B2* | 2/2021 | Oh | H04N 21/43632 |
| 2002/0162102 A1 | 10/2002 | Ihara | |
| 2006/0208929 A1 | 9/2006 | Cho | |
| 2008/0205306 A1* | 8/2008 | Saito | H04N 5/765 370/294 |
| 2009/0089850 A1* | 4/2009 | Nakajima | H04N 21/436 725/118 |
| 2009/0091656 A1* | 4/2009 | Kitaru | H04N 21/44222 348/554 |
| 2009/0160868 A1 | 6/2009 | Yato | |
| 2009/0201421 A1 | 8/2009 | Mawatari et al. | |
| 2009/0307734 A1 | 12/2009 | Doi et al. | |
| 2010/0073574 A1 | 3/2010 | Nakajima et al. | |
| 2010/0118188 A1 | 5/2010 | Nakajima et al. | |
| 2010/0128176 A1 | 5/2010 | Nakajima et al. | |
| 2010/0131991 A1 | 5/2010 | Tao | |
| 2010/0171817 A1* | 7/2010 | Tourapis | H04N 13/139 348/51 |
| 2010/0214480 A1 | 8/2010 | Kitamori | |
| 2010/0238806 A1* | 9/2010 | Saito | H04N 21/43632 370/241 |
| 2010/0251326 A1* | 9/2010 | Kamon | H04N 5/4401 725/133 |
| 2010/0275234 A1* | 10/2010 | Kamon | H04N 21/43632 725/58 |
| 2011/0032425 A1* | 2/2011 | Kamohara | H04N 5/765 348/553 |
| 2011/0141236 A1 | 6/2011 | Mitani et al. | |
| 2011/0292173 A1* | 12/2011 | Tsukagoshi | H04N 19/597 348/43 |
| 2013/0057774 A1* | 3/2013 | Yoshida | H04W 52/0229 348/725 |
| 2013/0128124 A1 | 5/2013 | Suzuki et al. | |
| 2013/0230296 A1 | 9/2013 | Yun et al. | |
| 2013/0308015 A1 | 11/2013 | Aokage | |
| 2014/0078020 A1* | 3/2014 | Yamada | G06F 3/147 345/1.1 |
| 2014/0211095 A1 | 7/2014 | Dickens et al. | |
| 2014/0211941 A1 | 7/2014 | Oh | |
| 2014/0218608 A1* | 8/2014 | Stelliga | H04N 21/43635 348/441 |
| 2015/0015667 A1 | 1/2015 | Laird et al. | |
| 2016/0044273 A1 | 2/2016 | Thompson | |
| 2016/0249102 A1* | 8/2016 | Minemura | H04N 21/4755 |
| 2017/0078082 A1* | 3/2017 | Kao | H04N 7/22 |
| 2017/0115740 A1* | 4/2017 | Kim | H04N 21/43635 |
| 2017/0195722 A1 | 7/2017 | Seo et al. | |
| 2019/0007731 A1* | 1/2019 | Sanders | H04N 5/46 |
| 2020/0209942 A1* | 7/2020 | Morita | G06F 1/3215 |
| 2020/0212898 A1* | 7/2020 | Morita | H03K 5/01 |

\* cited by examiner

| Byte # | 7 | 6 | 5 | 4 | 3 | 2 | 1 | 0 |
|---|---|---|---|---|---|---|---|---|
| 0 | Vendor-specific tag code (=3) | | | Length (=N) | | | | |
| 1 | 24-bit IEEE Registration Identifier (0xXXXXX) (least significant byte first) | | | | | | | |
| 2 | | | | | | | | |
| 3 | | | | | | | | |
| 4 | HDMI expanded function compatible bit | Rsvd (0) | Rsvd (0) | Rsvd (0) | Rsvd (0) | Rsvd (0) | Rsvd (0) | Rsvd (0) |

401

F I G. 4A

| Packet Byte # | 7 | 6 | 5 | 4 | 3 | 2 | 1 | 0 |
|---|---|---|---|---|---|---|---|---|
| PB0 | Checksum | | | | | | | |
| PB1 | 24bit IEEE Registration Identifier (0xXXXXX) (least significant byte first) | | | | | | | |
| PB2 | | | | | | | | |
| PB3 | | | | | | | | |
| PB4 | HDMI expanded function compatible bit | Rsvd (0) | Rsvd (0) | Rsvd (0) | Rsvd (0) | Rsvd (0) | Rsvd (0) | Rsvd (0) |

402

F I G. 4B

| No. | Video transmission device (Source device) | Video display device (Sink device) | |
|---|---|---|---|
| | | Received HDMI signal | Process |
| 1 | Expanded InfoFrame compatible device | InfoFrame expanded format | Switch according to HDMI expanded function compatible bit |
| 2 | HDMI 1.4b compatible device (device compatible only to normal InfoFrame) | Video and audio signal of 1.4b | Switch according to received video and audio signal (operated in 1.4b mode) |
| 3 | Device compatible to HDMI 2.x (device compatible only to normal InfoFrame) | Video and audio signal of 2.x | No switching (remained in 2.x mode) |

ELECTRONIC DEVICE

CROSS-REFERENCE TO RELATED APPLICATIONS

This application is a continuation of U.S. application Ser. No. 16/556,448, filed Aug. 30, 2019, which is based upon and claims the benefit of priority from Japanese Patent Application No. 2019-047270, filed Mar. 14, 2019, the entire contents of which are incorporated herein by reference.

FIELD

Embodiments described herein relate generally to an electronic device.

BACKGROUND

The HDMI (High-Definition Multimedia Interface) is one of the interfaces for transmitting video and audio as digital signals between electronic devices.

The HDMI standard has been repeatedly upgraded after version 1.0 (released in December 2002) to meet the needs of the electronic devices to be connected.

The HDMI standard is defined to be compatible so that problems do not occur even when electronic devices compliant with different versions are connected to each other. However, in the electronic devices that actually exist in the market, when electronic devices compliant with different HDMI standard versions are connected to each other, problems may occur in video display and audio output.

DETAILED DESCRIPTION

In general, according to one embodiment, an electronic device to be connected to a separate electronic device in compliance with the HDMI standard includes a memory, a transmitter and a receiver. The memory stores a first EDID including an identification bit set to respond to the separate electronic device when the separate electronic device supports a first version of the HDMI. The transmitter transmits the first EDID stored in the memory. The receiver receives a signal transmitted from the separate electronic device. When the receiver receives first control information including response information set in response to the identification bit from the separate electronic device, a compliant version of the HDMI to be operated is determined according to the response information. When the receiver does not receive the first control information including the response information from the separate electronic device, the compliant version of the HDMI to be operated is determined according to an attribute of a video and audio signal transmitted from the separate electronic device and received by the receiver.

Various embodiments will be described hereinafter with reference to the accompanying drawings.

Figure 1:
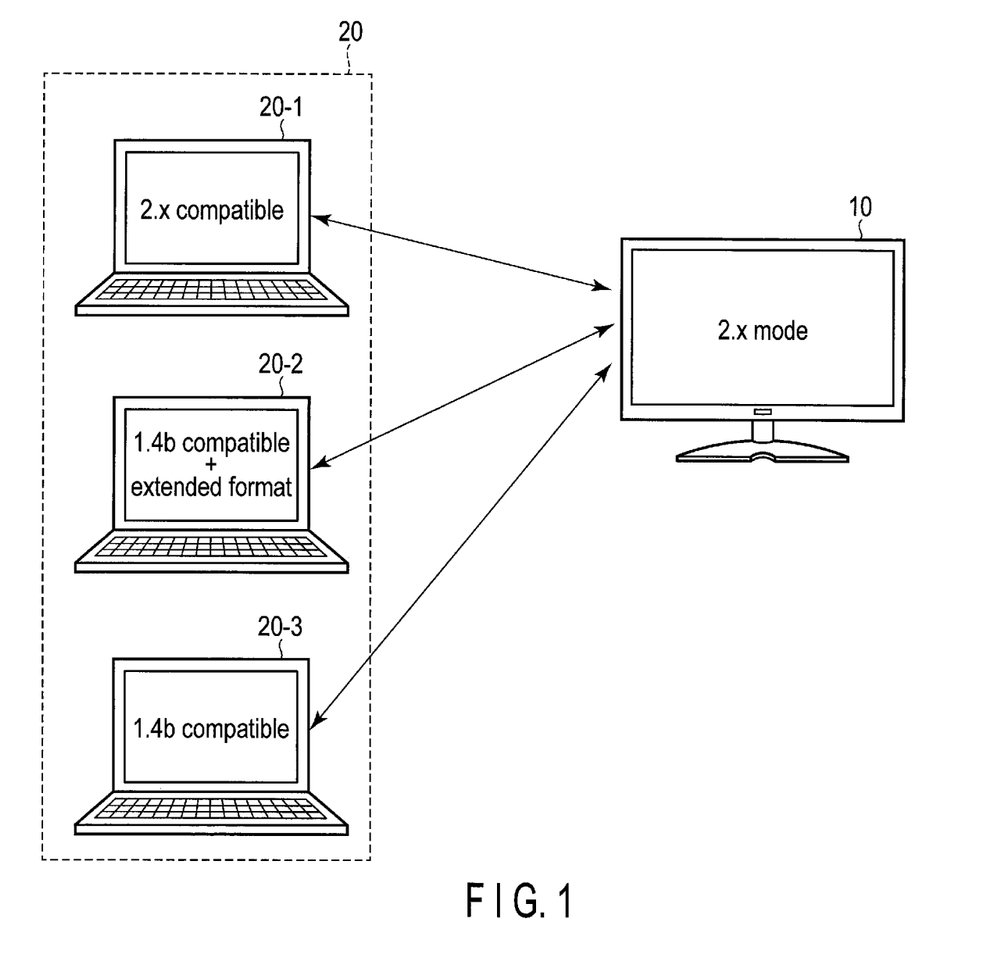
FIG. 1 is a diagram illustrating an example of connection between an electronic device according to the present embodiment and a video transmission device.

FIG. 1 is a diagram illustrating an example of connection between an electronic device 10 according to an embodiment and a video transmission device 20. As illustrated in FIG. 1, the electronic device 10 is connected to the video transmission device 20 via an HDMI cable 30, the electronic device 10 operates as a Sink device according to the HDMI standard, and the video transmission device 20 operates as a Source device according to the HDMI standard. The electronic device 10 may be, for example, a video display device. Hereinafter, the electronic device 10 will be described by taking the video display device 10 as an example.

The video display device 10 is a Sink device that receives a video and audio signal transmitted from the video transmission device 20 via the HDMI cable 30.

The video display device 10 and the video transmission device 20 connected to the video display device 10 may be compliant with different versions of the HDMI standard. The example of FIG. 1 illustrates a state in which a video transmission device 20-1 compliant with the standard of HDMI 2.x and not supporting an InfoFrame illustrated in FIG. 4B, a video transmission device 20-2 compliant with the standard of HDMI 1.4b and supporting an InfoFrame illustrated in FIG. 4B, and a video transmission device 20-3 compliant with the standard of HDMI 1.4b and not supporting an InfoFrame illustrated in FIG. 4B, are connected simultaneously with the video display device 10. However, the present embodiment is not limited to this configuration.

For example, the video display device 10 may be connected only to the video transmission device 20-1 and the video transmission device 20-2. Alternatively, the video display device 10 may be connected only to the video transmission device 20-1, connected only to the video transmission device 20-2, and connected only to the video transmission device 20-3 in time series by attaching and detaching the HDMI cable 30 by the user operation.

The video display device 10 is a Sink device that is compliant with an HDMI extended function (for example, HDMI 2.x) and includes the HDMI input terminal 111. Further, the video display device 10 holds information of both a data block compatible with HDMI 2.x and a data block compatible with HDMI 1.4b in order to transmit EDID (Extended Display Identification Data) as a response to the request of the video transmission device. Thus, the video display device 10 can select and transmit EDID based on HDMI 1.4b and EDID based on HDMI 2.x.

Further, the video display device 10 is assumed to operate in compliance with HDMI 2.x as a default operation, and can switch EDID based on HDMI 2.x to EDID based on HDMI 1.4b based on the InfoFrame and the HDMI signal illustrated in FIG. 4B transmitted from the video transmission device 20, and transmit the EDID. The switching process performed by the video display device 10 for switching from the EDID based on HDMI 2.x to the EDID based on HDMI 1.4b and transmitting the EDID will be described with reference to FIG. 6 to FIG. 10.

The video transmission device 20 is compliant with the HDMI standard, for example, and is a Source device that reads video and audio stored in a medium such as an optical disc (for example, a Blu-ray disc), and transmits a video and audio signal to the video display device 10 through the HDMI cable 30.

Figure 2:
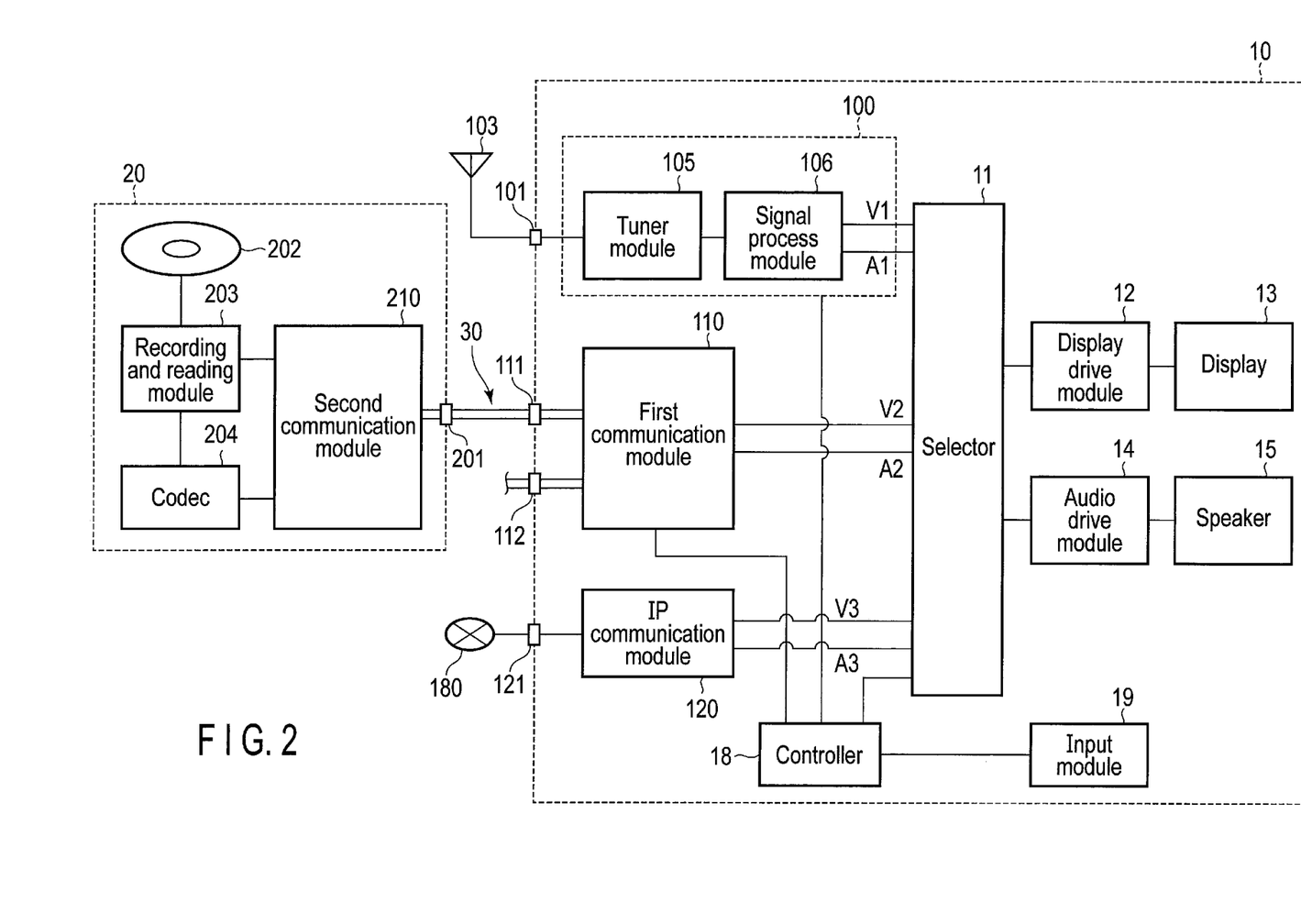
FIG. 2 is a view illustrating an example of a configuration of the electronic device and the video transmission device.

FIG. 2 is a diagram illustrating an example of a configuration of the video display device 10 and the video transmission device 20. As illustrated in FIG. 2, the video display device 10 includes a television function module 100, a first communication module 110, an IP communication module 120, a selector 11, a display drive module 12, a display 13, an audio drive module 14, a speaker 15, a controller 18, and an input module 19. The video display device 10 also includes an input terminal 101 for a connection to an antenna 103, an HDMI port (1) 111 and HDMI port (2) 112 for a connection to an HDMI cable 30, and a connector 121 for a connection to the network 180. The HDMI port may also be referred to as an HDMI connector. Note that in the example of FIG. 2, the number of HDMI ports is two, that is, the HDMI port (1) 111 and the HDMI port (2) 112, but the number is optional.

The television function module 100 includes a tuner module 105 and a signal process module 106, and receives a broadcast signal via the antenna 103.

The tuner module 105 receives a broadcast signal via the antenna 103 connected to the input terminal 101, and extracts a signal of a predetermined channel.

The signal process module 106 separates the signal of the predetermined channel extracted by the tuner module 105 into a video component and an audio component, and outputs the signal as a video signal V1 and an audio signal A1.

The first communication module 110 receives a video and audio signal (a signal encoded by Transition Minimized Differential Signaling (TMDS)) compliant with the HDMI standard. The first communication module 110 decodes the video and audio signals of the HDMI standard received via the HDMI cable 30 inserted into the HDMI port 111 (or the HDMI port 112), and separates the video and audio signal into a video component and an audio component, and output the video component and the audio component as a video signal V2 and an audio signal A2.

When the first communication module 110 is connected to a plurality of video transmission devices 20 via the HDMI port (1) 111 and the HDMI port (2) 112, the first communication module 110 selects one of the video and audio signal transmitted from the video transmission device 20 connected to the HDMI port (1) 111 and the video and audio signal transmitted from the video transmission device 20 connected to the HDMI port (2) 112, separates the video and audio signal received via the selected HDMI port into a video component and an audio component, and outputs the video component and the audio component as a video signal V2 and an audio signal A2.

The first communication module 110 selects one or more of the video and audio signal input from the HDMI port (1) 111 and the video and audio signal input from the HDMI port (2) 112 according to the "input switching instruction" received by the user operating the input module 19 and outputs the same to the selector 11.

The IP communication module 120 receives an IP broadcast signal including a video signal from the network 180 connected via the connector 121, separates the received IP broadcast signal into a video component and an audio component, and outputs the video component and the audio component as a video signal V3 and an audio signal A3. The service received as IP broadcast is, for example, a video on demand. The IP communication module 120 can also receive moving images distributed by a moving image distribution service server.

The selector 11 selects any one of the video signals and the audio signals that the television function module 100, the first communication module 110 and the IP communication module 120 output in order to input a video signal to the display drive module 12 and an audio signal to the audio drive module 14.

The selector 11 selects one of more of the video signals and the audio signals output from the television function module 100, the first communication module 110, and the IP communication module 120 according to the "input switching instruction" received by the user operating the input module 19, and outputs to the display drive module 12 and the audio drive module 14.

Specifically, the selector 11 selectively switches the video signal V1 and the audio signal A1 output form the television function module 100, the video signal V2 and the audio signal A2 output from the first communication module 110, and the video signal V3 and the audio signal A3 outputs from the IP communication module 120, and outputs to the display drive module 12 and the audio drive module 14.

The display drive module 12 causes the display 13 to display a video based on the video signal output from the selector 11.

The audio drive module 14 causes the speaker 15 to output audio based on the audio signal output from the selector 11.

The controller 18 controls each part of the video display device 10. For example, when the input of the setting operation is accepted by the input module 19, the controller 18 controls each part in accordance with the setting operation.

The input module 19 receives an input such as setting for the video display device 10. The input module 19 may be operated by the user. Alternatively, the input module 19 may have a receiving function of a remote controller, and may receive an instruction from the remote controller by user operation.

The video transmission device 20 includes a second communication module 210, a recording and reading module 203 and a codec 204. The video transmission device 20 also includes an HDMI port 201 for a connection to the HDMI cable 30.

The second communication module 210 transmits a video and audio signal (a signal encoded by Transition Minimized Differential Signaling (TMDS)) compliant with the HDMI standard. The second communication module 210 performs a control for encoding, for example, the video signal and the audio signal input from the codec 204 to the video and audio signal of the HDMI standard for transmitting the video and audio signal to the video display device 10 connected to the second communication module 210 via the HDMI cable 30 inserted into the HDMI port 201, and transmits to the video display device 10.

The recording and reading module 203 performs recording and reading on a recording medium 202 such as a DVD and a Blu-ray disc.

The codec 204 decodes the encoded data read from the recording medium 202 by the recording and reading module 203 into a video signal and an audio signal of a baseband and outputs to the second communication module 210 or, alternatively, encodes for recording data in the recording medium 202 and outputs to the recording and reading module 203.

Although the video display device 10 is an example provided with all of the television function module 100, the first communication module 110, and the IP communication module 120 in the example of FIG. 2, the present embodiment is not limited thereto, and the video display device 10 may be or may not be provided with the television function module 100 and the IP communication module 120 other than the first communication module 110.

Figure 3:
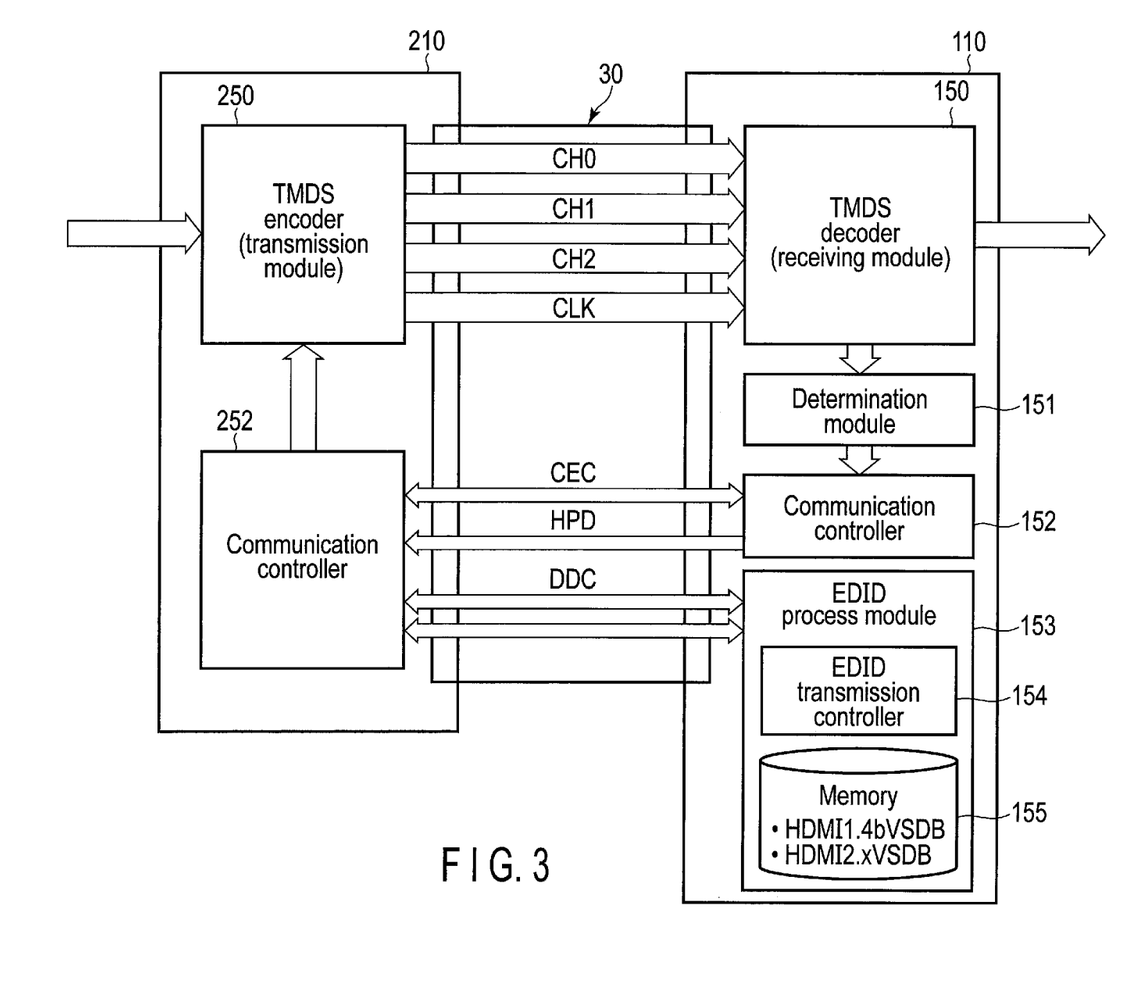
FIG. 3 is a block diagram illustrating an example of functional configurations of a first communication module of the electronic device and a second communication module of the video transmission device.

FIG. 3 is a block diagram illustrating an example of functional configurations of the first communication module 110 of the video display device 10 and the second communication module 210 of the video transmission device 20.

The first communication module 110 includes a TMDS decoder (reception module) 150, a determination module 151, a communication controller 152, and an EDID process module 153.

The TMDS decoder (reception module) 150 decodes the video and audio signal of the HDMI standard transmitted from the video transmission device 20 via the HDMI cable 30 and outputs the video and audio signal to the selector 11.

When the TMDS decoder 150 receives a video and audio signal via the HDMI cable 30, the determination module 151 determines whether the HDMI extended function compatible bit of InfoFrame included in the received video and audio signal is "ON (for example, 1)" or not. The determination process of the determination module 151 will be described with reference to FIG. 6 to FIG. 10.

The communication controller 152 communicates signals such as a consumer electronics control (CEC) line and a hot plug detect (HPD) line with the video transmission device 20.

The EDID process module 153 includes an EDID transmission controller 154 and a memory 155, and performs an EDID transmission process.

The memory 155 holds an HDMI 1.4b data block and an HDMI 2.x data block. The HDMI 1.4b data block and the HDMI 2.x data block hold EDID indicating the capability of the video display device 10, such as a format that the video display device 10 can use.

The second communication module 210 includes a TMDS encoder (transmission module) 250 and a communication controller 252.

The TMDS encoder (transmission module) 250 performs a control for encoding the video and audio signal input from the codec 204 into a video and audio signal of the HDMI standard for transmission to the video display device 10 via the HDMI cable 30, and transmitting the video and audio signal to the video display device 10.

The communication controller 252 communicates signals such as the CEC line and the HPD line with the video display device 10.

The communication controller 252 is also connected to the EDID process module 153 of the video display device 10 via the DDC line. The communication controller 252 receives EDID transmitted by the EDID process module 153.

Figure 4A:
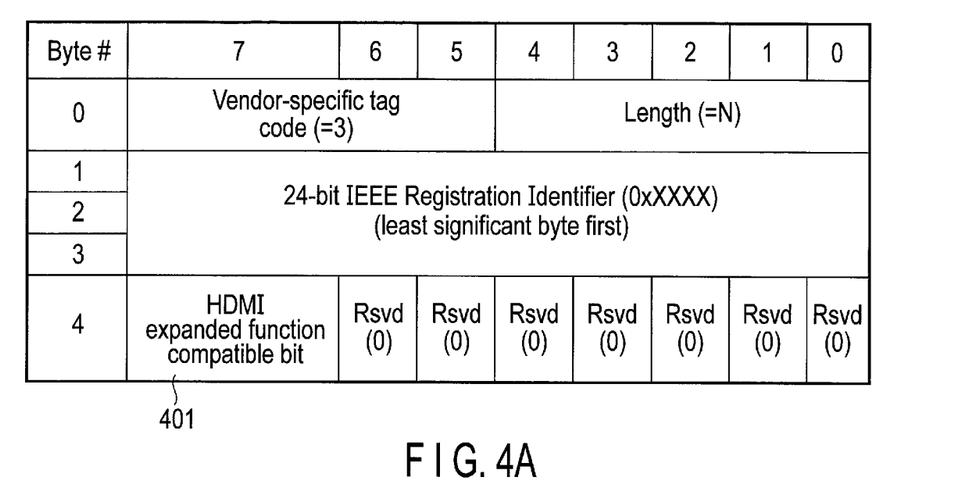
FIG. 4A is a view illustrating an example of a format of EDID transmitted by the electronic device as a response to a request from the video transmission device.
Figure 4B:
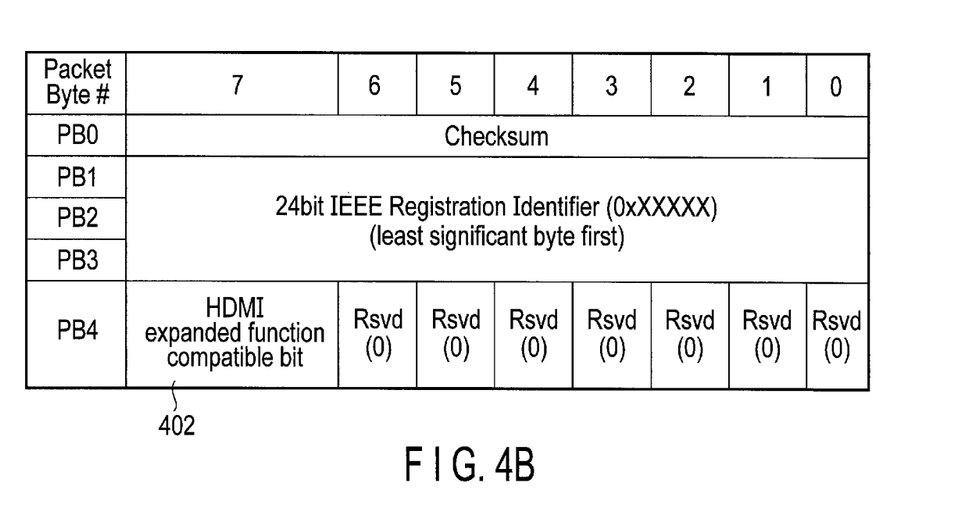
FIG. 4B is a diagram illustrating an example of a format of an extended InfoFrame received by the electronic device.

FIG. 4A is a view illustrating an example of a format of EDID transmitted by the video display device 10 as a response to a request from the video transmission device 20.

EDID sent out by the video display device 10 includes, as an HDMI Forum data block, a Vendor-specific tag code, Length, or a 24-bit IEEE Registration Identifier of the HDMI 1.4b data block or the HDMI 2.x data block. Further, EDID transmitted by the video display device 10 includes an HDMI extended function compatible bit 401 in an optional area in a reserve area. The HDMI extended function compatible bit 401 is an identification bit for presenting to the video transmission device 20 which is a source device whether or not the video transmission device 20 is compliant with the HDMI extended function (for example, version 2.x compatible).

If the video transmission device 20 that has received EDID including the HDMI extended function compatible bit 401 can recognize that the HDMI extended function compatible bit 401 is "ON (for example, 1)", the compliance of the HDMI extended function is presented to the video display device 10 using the extended InfoFrame illustrated in FIG. 4B.

FIG. 4B is a diagram illustrating an example of the format of the extended InfoFrame received by the video display device 10.

The extended InfoFrame received by the video display device 10 includes a Checksum and a 24-bit IEEE Registration Identifier. Further, the extended InfoFrame received by the video display device 10 includes an HDMI extended function compatible bit 402 in an optional area of the reserve area. The HDMI extended function compatible bit 402 is a bit assigned as a response to the HDMI extended function compatible bit 401 of EDID illustrated in FIG. 4A.

If the video display device 10 sets the HDMI extended function compatible bit 401 of EDID to "ON (for example, 1)" and transmits, the video transmission device 20 sets a value to the HDMI extended function compatible bit 402 of the HDMI extended function compatible bit 401 and transmits the extended InfoFrame to the video display device 10 when the fact that the value is "ON (for example, 1)" can be recognized. The value set to the HDMI extended function compatible bit 402 of the extended InfoFrame by the video transmission device 20 is "ON (for example, 1)" when being compliant with the HDMI extended function (for example, version 2.x compatible), and "OFF (for example, 0)" when not being compliant with the HDMI.

Thus, the video display device 10 can confirm whether the video transmission device 20 supports the HDMI extended function or not. Hereinafter, the extended InfoFrame including the HDMI extended function compatible bit 402 illustrated in FIG. 4B will be referred to as an extended InfoFrame. Also, an InfoFrame in a format that does not include the HDMI extended function compatible bit 402 is referred to as a normal InfoFrame. The process of the video display device 10 when the InfoFrame is received will be described with reference to FIG. 5 to FIG. 10.

Figure 5:
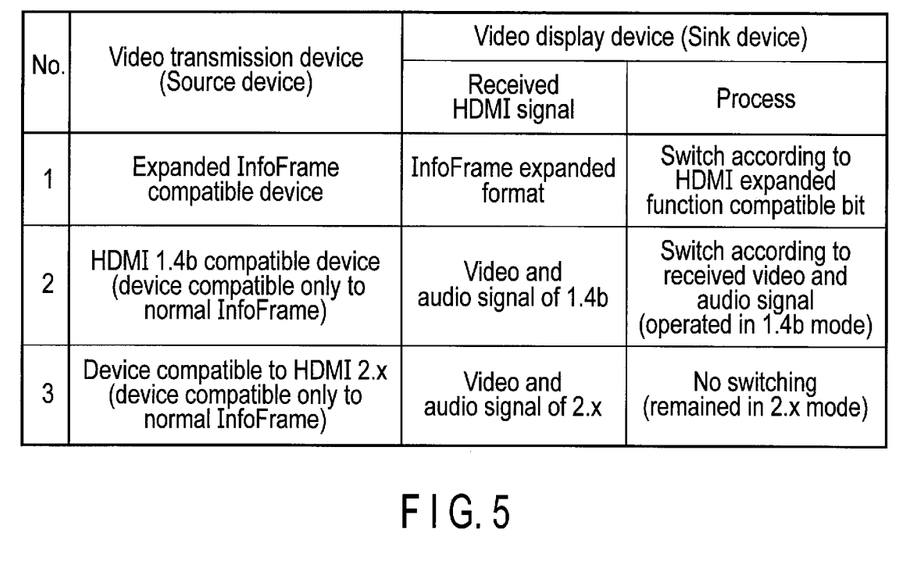
FIG. 5 illustrates an example of combinations of types of video transmission devices (Source devices) connected by the electronic device (Sink device) via an HDMI cable, and process contents which a video display device (Sink device) performs compatible with the types.

FIG. 5 illustrates an example of combinations of types of the video transmission device (Source device) 20 connected by the video display device (Sink device) 10 via the HDMI cable 30, and process contents which a video display device (Sink device) 10 performs corresponding to the types.

The combination No. 1 is an example of a combination of the video transmission device (Source device) 20 compatible with the extended InfoFrame and the process performed by the video display device 10 (Sink device).

The combination of No. 2 is an example of a combination of the video transmission device (Source device) 20 compatible with only the normal InfoFrame and compliant with the HDMI 1.4b and the process performed by the video display device (Sink device) 10.

The combination of No. 3 is an example of a combination of the video transmission device (Source device) 20 compatible with only the normal InfoFrame and compliant with the HDMI 2.x and the process performed by the video display device (Sink device) 10.

The combination of No. 1 indicates that when the video display device (Sink device) 10 receives the extended InfoFrame transmitted from the video transmission device 20 in response to the transmitted EDID, the video display device (Sink device) 10 performs such a control whether to operate with HDMI 2.x or with HDMI 1.4b according to the value of the HDMI extended function compatible bit 402 included in the received extended InfoFrame.

The combination of No. 2 indicates that when the video display device (Sink device) 10 receives the normal InfoFrame transmitted from the video transmission device 20 in response to the transmitted EDID, the video display device (Sink device) 10 performs a control to switch to the operation with the HDMI 1.4b based on the result of analysis of continuously transmitted video and audio signal and continuously receive the video and audio signal.

The combination of No. 3 indicates that when the video display device (Sink device) 10 receives the normal InfoFrame transmitted from the video transmission device 20 in response to the transmitted EDID, the video display device (Sink device) 10 performs a control to continue the operation with the HDMI 2.x based on the result of analysis of continuously transmitted video and audio signal and continuously receive the video signal.

FIG. 6 to FIG. 9 are diagrams illustrating an example of process regarding activation and connection of the video display device (Sink device) 10 and the video transmission device (Source device) 20 after the power is turned ON in the combination of No. 1 to No. 3 in FIG. 5.

Figure 6:
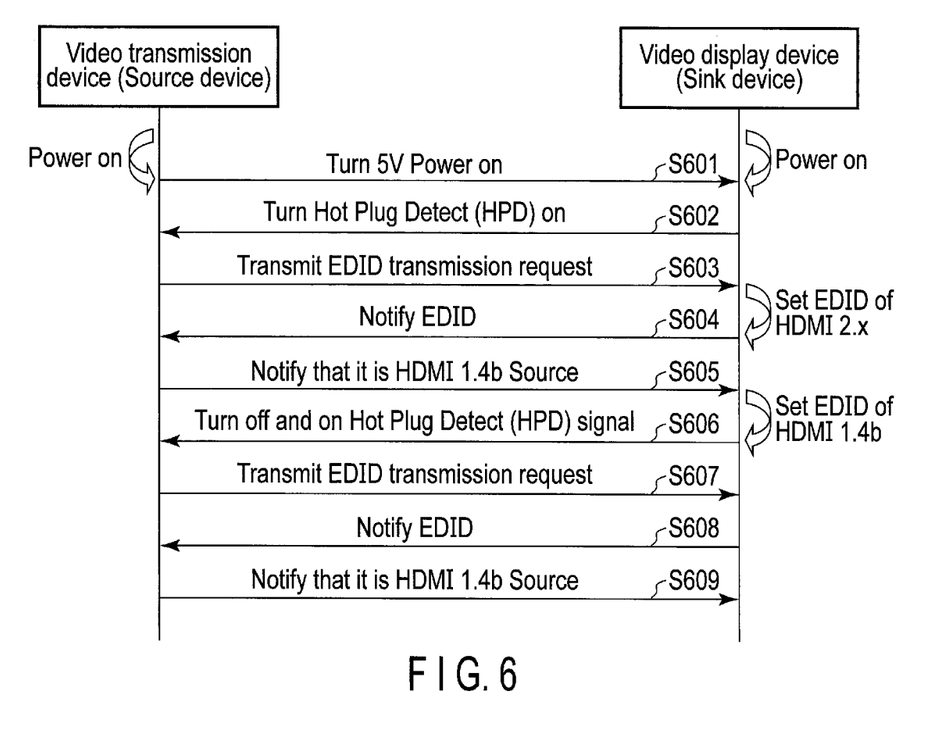
FIG. 6 illustrates an example of a connection process sequence when the electronic device is connected to the video transmission device compliant with a standard of HDMI 1.4b and further supporting the InfoFrame illustrated in FIG. 4B.

FIG. 6 illustrates an example of a connection process sequence when the electronic device 10 according to the present embodiment is connected to the video transmission device 20 compliant with a standard of HDMI 1.4b and further supporting the extended InfoFrame illustrated in FIG. 4B. The video transmission device (Source device) 20 illustrated in FIG. 6 is compliant with the HDMI 1.4b, and the process sequence corresponds to the case of the combination No. 1 of FIG. 5.

The second communication module 210 of the video transmission device (Source device) 20 supplies power to the 5V power supply line when the power is turned ON. The first communication module 110 of the video display device (Sink device) 10 recognizes that the video transmission device (Source device) 20 is powered on by detecting the voltage of a 5V power supply line when the power is turned ON (S601).

The communication controller 152 of the video display device (Sink device) 10, which recognizes that the video transmission device (Source device) 20 is powered ON, transmits HPD "High" via the HPD line (S602).

The communication controller 252 of the video transmission device (Source device) 20 recognizes that the video display device (Sink device) 10 is connected by detecting that the HPD line has become "High" (S602).

The communication controller 252 of the video transmission device (Source device) 20, which detects that the HPD has become "High", transmits EDID transmission request to the communication controller 152 of the video display device (Sink device) 10 (S603).

The communication controller 152 of the video display device (Sink device) 10, which have received the EDID transmission request, transmits the EDID of the HDMI 2.x data block to the video transmission device (Source device) 20 by the EDID transmission controller 154 (S604). The EDID transmission controller 154 transmits the EDID in which the HDMI extended function compatible bit 401 illustrated in FIG. 4A is set to "ON (for example, 1)" to the video transmission device (Source device) 20 (S604).

If the video transmission device (Source device) 20 that has received the EDID supports the extended InfoFrame, the video transmission device (Source device) 20 analyzes the HDMI extended function compatible bit 401, determines a value to be set to the HDMI extended function compatible bit 402 of the extended InfoFrame according to the analysis result and the version of HDMI with which the video transmission device (Source device) 20 is compliant, sets the determined value, and transmits the extended InfoFrame to the video display device (Sink device) 10. When the video transmission device (Source device) 20 does not support the extended InfoFrame, the presence of the HDMI extended function compatible bit 401 included in the EDID cannot be recognized, and thus the video transmission device (Source device) 20 does not transmit the extended InfoFrame to the video display device (Sink device) 10.

The video transmission device (Source device) 20 illustrated in FIG. 6 supports the extended InfoFrame, and is a video transmission device compliant with the HDMI 1.4b. Therefore, the video transmission device (Source device) 20 sets the HDMI extended function compatible bit 402 to "OFF", and transmits the extended InfoFrame to the video display device (Sink device) 10 by the TMDS encoder 250 (S605).

The TMDS decoder 150 of the video display device (Sink device) 10 that has received the extended InfoFrame in which the HDMI extended function compatible bit 402 is set to "OFF" transmits the received extended InfoFrame to the determination module 151.

The determination module 151 recognizes the version of the HDMI with which the video transmission device (Source device) 20 is compliant by analyzing the value of the HDMI extended function compatible bit 402 included in the received extended InfoFrame.

In the case of FIG. 6, since the HDMI extended function compatible bit 402 is "OFF" (for example, not compliant with version 2.x compatible), the determination module 151 recognizes such that the video transmission device (Source device) 20 is a device compliant with the HDMI 1.4b.

As described above, the video display device (Sink device) 10 can recognize that the video transmission device (Source device) 20 is a device compliant with the HDMI 1.4b. Therefore, the video display device (Sink device) 10 is switched to operate as the HDMI 1.4b, and continues the process for reconnection with the video transmission device (Source device) 20 as the operation of the HDMI 1.4b.

The determination module 151 notifies the communication controller 152 that the determination module 151 has recognized that the video transmission device (Source device) 20 is a device compliant with the HDMI 1.4b.

The communication controller 152 that has received the notification switches the video display device (Sink device) 10 to operate as the HDMI 1.4b, transmits HPD "Low" via the HPD line, and then transmits HPD "High" to reconnect to the video transmission device (Source device) 20 as the HDMI 1.4b (S606). Note that the video display device (Sink device) 10 may store, for example, in the memory 155, information on the operation (operation as the HDMI 1.4b) determined by the exchange with the video transmission device (Source device) 20, and use the information for EDID to be transmitted when the power supplies of the video display device (Sink device) 10 and the video transmission device (Source device) 20 are turned ON.

The communication controller 252 of the video transmission device (Source device) 20, which detects that the HPD has transferred from "Low" to "High", transmits EDID transmission request to the communication controller 152 of the video display device (Sink device) 10 (S607).

The communication controller 152 of the video display device (Sink device) 10, which have received the EDID transmission request, transmits the EDID of the HDMI 1.4b data block to the video transmission device (Source device) 20 by the EDID transmission controller 154 (S608). The EDID transmission controller 154 transmits the EDID in which the HDMI extended function compatible bit 401 illustrated in FIG. 4A is set to "OFF (for example, 0)".

The video transmission device (Source device) 20 that has received the EDIE sets the HDMI extended function compatible bit 402 to "OFF", and transmits the InfoFrame to the video display device (Sink device) 10 by the TMDS encoder 250 (S609).

The TMDS decoder 150 of the video display device (Sink device) 10 that has received the InfoFrame in which the HDMI extended function compatible bit 402 is set to "OFF" transmits the received InfoFrame to the determination module 151.

The video display device (Sink device) 10 recognizes that the video transmission device (Source device) 20 is a device compliant with the HDMI 1.4b by analyzing the HDMI extended function compatible bit 402 of InfoFrame by the determination module 151.

Thus, the video display device (Sink device) 10 can perform a reception process for a video and audio signal transmitted from the video transmission device (Source device) 20 by recognizing the video transmission device (Source device) 20 as a device compliant with the HDMI 1.4b.

Figure 7:
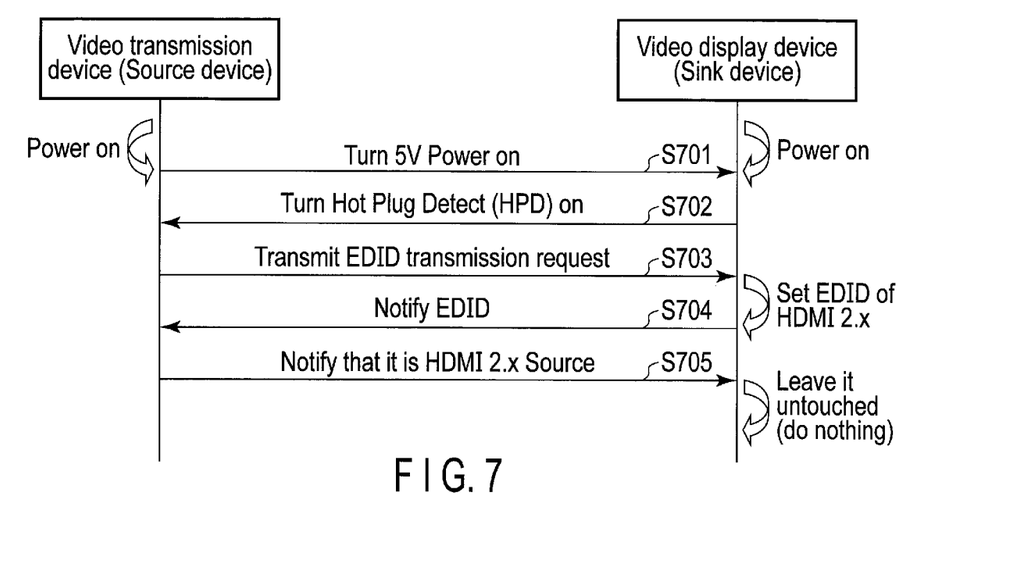
FIG. 7 illustrates another example of a connection process sequence when the electronic device is connected to the video transmission device compliant with a standard of HDMI 2.x and further supporting the InfoFrame illustrated in FIG. 4B.

FIG. 7 illustrates another example of a connection process sequence when the electronic device 10 according to the present embodiment is connected to the video transmission device 20 compliant with a standard of HDMI 2.x and further supporting the InfoFrame illustrated in FIG. 4B. The video transmission device (Source device) 20 illustrated in FIG. 7 is compliant with the HDMI 2.x, and the process sequence corresponds to the case of the combination No. 1 of FIG. 5.

The second communication module 210 of the video transmission device (Source device) 20 supplies power to the 5V power supply line when the power is turned ON. The first communication module 110 of the video display device (Sink device) 10 recognizes that the video transmission device (Source device) 20 is powered on by detecting the voltage of a 5V power supply line when the power is turned ON (S701).

The communication controller 152 of the video display device (Sink device) 10, which recognizes that the video transmission device (Source device) 20 is powered ON, transmits HPD "High" via the HPD line (S702).

The communication controller 252 of the video transmission device (Source device) 20 recognizes that the video display device (Sink device) 10 is connected by detecting that the HPD line has become "High" (S702).

The communication controller 252 of the video transmission device (Source device) 20, which detects that the HPD has become "High", transmits EDID transmission request to the communication controller 152 of the video display device (Sink device) 10 (S703).

The communication controller 152 of the video display device (Sink device) 10, which have received the EDID transmission request, transmits the EDID of the HDMI 2.x data block to the video transmission device (Source device) 20 by the EDID transmission controller 154 (S704). The EDID transmission controller 154 transmits the EDID in which the HDMI extended function compatible bit 401 illustrated in FIG. 4A is set to "ON (for example, 1)" to the video transmission device (Source device) 20 (S704).

If the video transmission device (Source device) 20 that has received the EDID supports the extended InfoFrame, the video transmission device (Source device) 20 analyzes the HDMI extended function compatible bit 401, determines a value to be set to the HDMI extended function compatible bit 402 of the extended InfoFrame according to the analysis result and the version of HDMI with which the video transmission device (Source device) 20 is compliant, sets the determined value, and transmits the extended InfoFrame to the video display device (Sink device) 10. When the video transmission device (Source device) 20 does not support the extended InfoFrame, the presence of the HDMI extended function compatible bit 401 included in the EDID cannot be recognized, and thus the video transmission device (Source device) 20 does not transmit the extended InfoFrame to the video display device (Sink device) 10.

The video transmission device (Source device) 20 illustrated in FIG. 7 supports the extended InfoFrame, and is a video transmission device compliant with the HDMI 2.x. Therefore, the video transmission device (Source device) 20 sets the HDMI extended function compatible bit 402 to "ON", and transmits the InfoFrame to the video display device (Sink device) 10 by the TMDS encoder 250 (S705).

The TMDS decoder 150 of the video display device (Sink device) 10 that has received the extended InfoFrame in which the HDMI extended function compatible bit 402 is set to "ON" transmits the received extended InfoFrame to the determination module 151.

The determination module 151 recognizes the version of the HDMI with which the video transmission device (Source device) 20 is compliant by analyzing the value of the HDMI extended function compatible bit 402 included in the received extended InfoFrame.

In the case of FIG. 7, since the HDMI extended function compatible bit 402 is "ON" (for example, compliant with version 2.x compatible), the determination module 151 recognizes such that the video transmission device (Source device) 20 is a device compliant with the HDMI 2.x.

As described above, the video display device (Sink device) 10 can recognize that the video transmission device (Source device) 20 is a device compliant with the HDMI 2.x. Since the video display device (Sink device) 10 is set to operate as HDMI 2.x, the determination module 151 of the video display device (Sink device) 10 terminates the connection process with the video transmission device (Source device) 20. Note that the video display device (Sink device) 10 may store, for example, in the memory 155, information on the operation (operation as the HDMI 2.x) determined by the exchange with the video transmission device (Source device) 20, and use the information for EDID to be transmitted when the power supplies of the video display device (Sink device) 10 and the video transmission device (Source device) 20 are turned ON.

Thus, the video display device (Sink device) 10 can perform a reception process for a video and audio signal transmitted from the video transmission device (Source device) 20 by recognizing the video transmission device (Source device) 20 as a device compliant with the HDMI 2.x.

Figure 8:
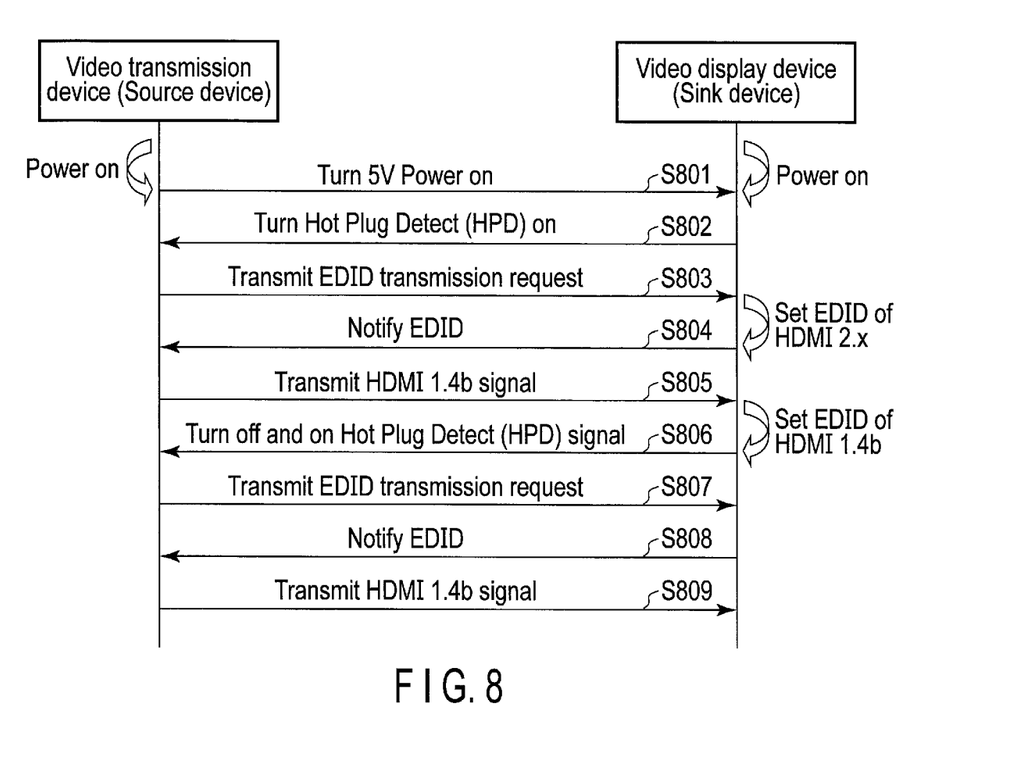
FIG. 8 illustrates another example of a connection process sequence when the electronic device is connected to the video transmission device compliant with a standard of HDMI 1.4b and not supporting the InfoFrame illustrated in FIG. 4B.

FIG. 8 illustrates another example of a connection process sequence when the electronic device 10 according to the present embodiment is connected to the video transmission device 20 compliant with a standard of HDMI 1.4b and not supporting the extended InfoFrame illustrated in FIG. 4B. The video transmission device (Source device) 20 illustrated in FIG. 8 is compliant with the HDMI 1.4b, and the process sequence corresponds to the case of the combination No. 2 of FIG. 5.

The second communication module 210 of the video transmission device (Source device) 20 supplies power to the 5V power supply line when the power is turned ON. The first communication module 110 of the video display device (Sink device) 10 recognizes that the video transmission device (Source device) 20 is powered on by detecting the voltage of a 5V power supply line when the power is turned ON (S801).

The communication controller 152 of the video display device (Sink device) 10, which recognizes that the video transmission device (Source device) 20 is powered ON, transmits HPD "High" via the HPD line (S802).

The communication controller 252 of the video transmission device (Source device) 20 recognizes that the video display device (Sink device) 10 is connected by detecting that the HPD line has become "High" (S802).

The communication controller 252 of the video transmission device (Source device) 20, which detects that the HPD has become "High", transmits EDID transmission request to the communication controller 152 of the video display device (Sink device) 10 (S803).

The communication controller 152 of the video display device (Sink device) 10, which have received the EDID transmission request, transmits the EDID of the HDMI 2.x data block to the video transmission device (Source device) 20 by the EDID transmission controller 154 (S804). The EDID transmission controller 154 transmits the EDID in which the HDMI extended function compatible bit 401 illustrated in FIG. 4A is set to "ON (for example, 1)".

If the video transmission device (Source device) 20 that has received the EDID supports the extended InfoFrame, the video transmission device (Source device) 20 analyzes the HDMI extended function compatible bit 401, determines a value to be set to the HDMI extended function compatible bit 402 of the extended InfoFrame according to the analysis result and the version of HDMI with which the video transmission device (Source device) 20 is compliant, sets the determined value, and transmits the extended InfoFrame to the video display device (Sink device) 10. When the video transmission device (Source device) 20 does not support the extended InfoFrame, the presence of the HDMI extended function compatible bit 401 included in the EDID cannot be recognized, and thus the video transmission device (Source device) 20 does not transmit the extended InfoFrame to the video display device (Sink device) 10.

The video transmission device (Source device) 20 illustrated in FIG. 8 does not support the extended InfoFrame, and is a video transmission device compliant with HDMI 1.4b. Therefore, the video transmission device (Source device) 20 cannot recognize the HDMI extended function compatible bit 401 of the received EDID, and transmits the video and audio signal compliant with the HDMI 1.4b by the TMDS encoder 250 without transmitting the extended InfoFrame (S805).

The TMDS decoder 150 of the video display device (Sink device) 10, which has received the video and audio signal compliant with the HDMI 1.4b, analyzes the received video and audio signal to recognize that the received video and audio signal is a signal compliant with the HDMI 1.4b and that the extended InfoFrame has not been received.

When the TMDS decoder 150 attempts to recognize that the received video and audio signal is a signal compliant with the HDMI 1.4b, if one of (1) the HDMI signal rate is 10.2 Gbps or less, and the color space is not 4:2:0 format or HDR format and (2) DVI signals is included is satisfied, the TMDS decoder 150 recognizes that the received video and audio signal is a signal compliant with the HDMI 1.4b. The TMDS decoder 150 may also recognize that the received video and audio signal is a signal compliant with the HDMI 1.4b using information indicating an attribute of the HDMI 1.4b in addition to the above-described information.

As described above, the video display device (Sink device) 10 can recognize that the video transmission device (Source device) 20 is a device compliant with the HDMI 1.4b. Therefore, the video display device (Sink device) 10 is switched to operate as the HDMI 1.4b, and continues the process for reconnection with the video transmission device (Source device) 20 as the operation of the HDMI 1.4b.

The TMDS decoder 150 notifies the communication controller 152 that the video transmission device Source device) 20 is recognized to be a device compliant with the HDMI 1.4b.

The communication controller 152 that has received the notification switches the video display device (Sink device) 10 to operate as the HDMI 1.4b, transmits HPD "Low" via the HPD line and then transmits HPD "High" to reconnect to the video transmission device (Source device) 20 as the HDMI 1.4b (S806). Note that the video display device (Sink device) 10 may store, for example, in the memory 155, information on the operation (operation as the HDMI 1.4b) determined by the exchange with the video transmission device (Source device) 20, and use the information for EDID to be transmitted when the power supplies of the video display device (Sink device) 10 and the video transmission device (Source device) 20 are turned ON.

The communication controller 252 of the video transmission device (Source device) 20, which detects that the HPD has transferred from "Low" to "High", transmits an EDID transmission request to the communication controller 152 of the video display device (Sink device) 10 (S807).

The communication controller 152 of the video display device (Sink device) 10, which have received the EDID transmission request, transmits EDID of the HDMI 1.4b data block to the video transmission device (Source device) 20 by the EDID transmission controller 154 (S808). The EDID transmission controller 154 transmits the EDID in which the HDMI extended function compatible bit 401 illustrated in FIG. 4A is set to "OFF (for example, 0)".

The video transmission device (Source device) 20 that has received the EDIE transmits a video and audio signal compliant with the HDMI 1.4b (809).

Thus, the video display device (Sink device) 10 can perform a reception process for a video and audio signal transmitted from the video transmission device (Source device) 20 by recognizing the video transmission device (Source device) 20 as a device compliant with the HDMI 1.4b.

Note that a case where the TMDS decoder 150 receives the extended InfoFrame after recognizing that the video and audio signal received in S805 is a signal compliant with the HDMI 1.4b is assumed. In this case, the video display device (Sink device) 10 may continue the operation in compliance with the already set HDMI 1.4b, or determines the version of the HDMI operating in compliance in response to the received extended InfoFrame.

Figure 9:
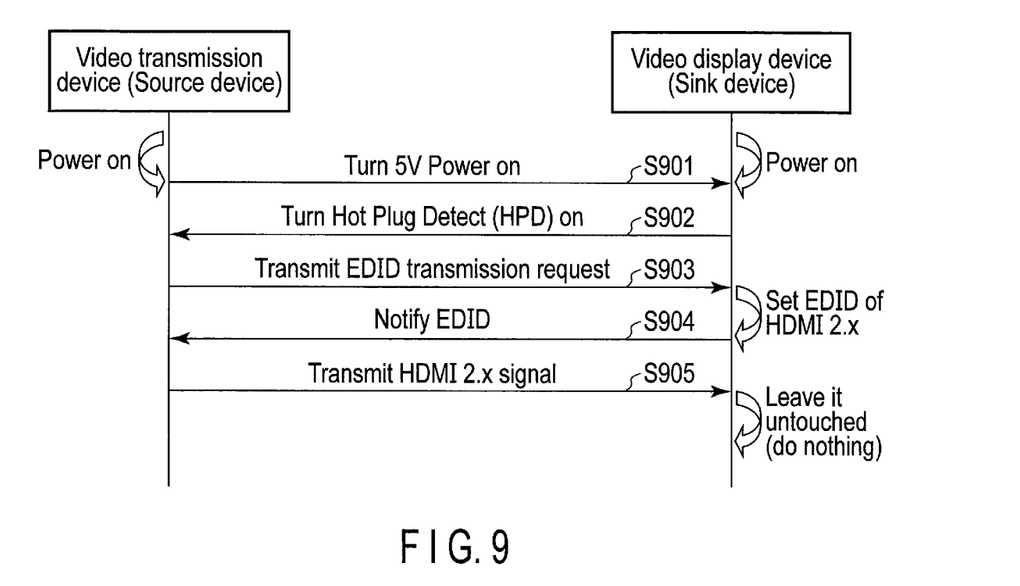
FIG. 9 illustrates another example of a connection process sequence when the electronic device is connected to the video transmission device compliant with a standard of HDMI 2.x and not supporting the InfoFrame illustrated in FIG. 4B.

FIG. 9 illustrates another example of a connection process sequence when the electronic device 10 according to the present embodiment is connected to the video transmission device 20 compliant with a standard of HDMI 2.x and not supporting the InfoFrame illustrated in FIG. 5. The video transmission device (Source device) 20 illustrated in FIG. 9 is compliant with the HDMI 2.x, and the process sequence corresponds to the case of the combination No. 3 of FIG. 5.

The second communication module 210 of the video transmission device (Source device) 20 supplies power to the 5V power supply line when the power is turned ON. The first communication module 110 of the video display device (Sink device) 10 recognizes that the video transmission device (Source device) 20 is powered on by detecting the voltage of a 5V power supply line when the power is turned ON (S901).

The communication controller 152 of the video display device (Sink device) 10, which recognizes that the video transmission device (Source device) 20 is powered ON, transmits HPD "High" via the HPD line (S902).

The communication controller 252 of the video transmission device (Source device) 20 recognizes that the video display device (Sink device) 10 is connected by detecting that the HPD line has become "High" (S902).

The communication controller 252 of the video transmission device (Source device) 20, which detects that the HPD has become "High", transmits EDID transmission request to the communication controller 152 of the video display device (Sink device) 10 (S903).

The communication controller 152 of the video display device (Sink device) 10, which have received EDID transmission request, transmits EDID of the HDMI 2.x data block to the video transmission device (Source device) 20 by the EDID transmission controller 154 (S904). The EDID transmission controller 154 transmits EDID in which the HDMI extended function compatible bit 401 illustrated in FIG. 4A is set to "ON (for example, 1)" to the video transmission device (Source device) 20.

If the video transmission device (Source device) 20 that has received EDID supports the extended InfoFrame, the video transmission device (Source device) 20 analyzes the HDMI extended function compatible bit 401, determines a value of the HDMI extended function compatible bit 402 of the extended InfoFrame according to the analysis result and the version of HDMI with which the video transmission device (Source device) 20 is compliant, sets the determined value and transmits the extended InfoFrame to the video display device (Sink device) 10. When the video transmission device (Source device) 20 does not support the extended InfoFrame, the presence of the HDMI extended function compatible bit 401 included in the EDID cannot be recognized, and thus the video transmission device (Source device) 20 does not transmit the extended InfoFrame to the video display device (Sink device) 10.

The video transmission device (Source device) 20 illustrated in FIG. 9 does not support the extended InfoFrame, and is a video transmission device compliant with the HDMI 2.x. Therefore, the video transmission device (Source device) 20 transmits the video and audio signal compliant with the HDMI 2.x by the TMDS encoder 250 without transmitting the extended InfoFrame (S905).

The TMDS decoder 150 of the video display device (Sink device) 10, which has received the video and audio signal compliant with HDMI 2.x, analyzes the received video and audio signal to recognize that the received video and audio signal is a signal compliant with the HDMI 1.4b and that the extended InfoFrame has not been received.

As described above, the video display device (Sink device) 10 can recognize that the video transmission device (Source device) 20 is a device compliant with the HDMI 2.x. Since the video display device (Sink device) 10 is set to operate as HDMI 2.x, the TMDS decoder 150 of the video display device (Sink device) 10 terminates the connection process with the video transmission device (Source device) 20. Note that the video display device (Sink device) 10 may store, for example, in the memory 155, information on the operation (operation as the HDMI 2.x) determined by the exchange with the video transmission device (Source device) 20, and use the information for EDID to be transmitted when the power supplies of the video display device (Sink device) 10 and the video transmission device (Source device) 20 are turned ON.

Thus, the video display device (Sink device) 10 can perform a reception process for a video and audio signal transmitted from the video transmission device (Source device) 20 by recognizing the video transmission device (Source device) 20 as a device compliant with the HDMI 2.x.

Figure 10:
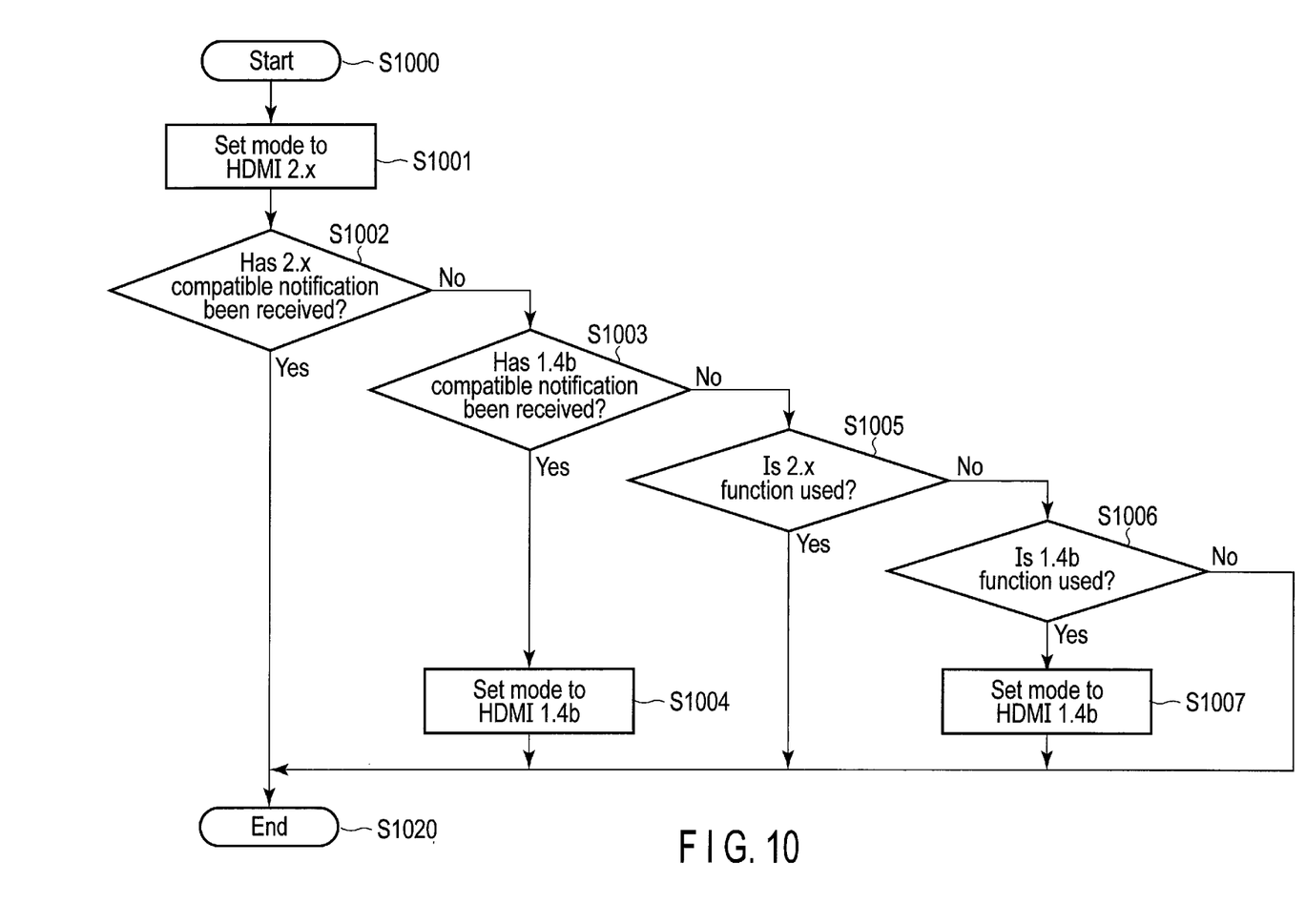
FIG. 10 is a diagram illustrating an example of a process flow of the electronic device, switching the version of the HDMI to operate according to the version of the HDMI with which the connected video transmission device is compliant.

FIG. 10 is a diagram illustrating an example of a process flow of the electronic device 10 according to the present embodiment, switching the version of the HDMI to operate, according to the version of the HDMI with which the connected video transmission device is compliant.

When the video display device (Sink device) 10 starts connection with the video transmission device (Source device) 20, the video display device (Sink device) 10 starts a process of switching the version of the HDMI to be operated (S1000). The start of connection with the video transmission device (Source device) 20 is, for example, timing when the video display device (Sink device) 10 in S601 in FIG. 6 detects the voltage of the 5V power supply line.

The video display device (Sink device) 10 sets various functions to achieve operation as HDMI 2.x (S1001).

When the video display device (Sink device) 10 receives the extended InfoFrame from the video transmission device (Source device) 20 (S1002, S1003), the video display device (Sink device) 10 analyzes the value of the HDMI extended function compatible bit 402.

If the HDMI extended function compatible bit 402 is "ON" (Yes in S1002) as a result of analysis, the video display device (Sink device) 10 continues the operation as HDMI 2.x. The process performed by the video display device (Sink device) 10 for continuing the operation as the HDMI 2.x is, for example, the process after the reception of the extended InfoFrame in S705 of FIG. 7.

If the HDMI extended function compatible bit 402 is "OFF" (Yes in S1003) as a result of analysis, the video display device (Sink device) 10 switches the operation to an operation as HDMI 1.4b. The process performed by the video display device (Sink device) 10 for switching the operation to an operation as the HDMI 1.4b is, for example, a process after reconnection with the video transmission device (Source device) 20 in S606 of FIG. 6.

When the video display device (Sink device) 10 receives an HDMI video and audio signal without receiving the extended InfoFrame from the video transmission device (Source device) 20 (S1005, S1006), the video display device (Sink device) 10 analyzes the version of the HDMI with which the received video and audio signal is compliant.

If the version of the HDMI is HDMI 2.x as a result of analysis (Yes in S1005), the video display device (Sink device) 10 continues an operation as the HDMI 2.x. The process performed by the video display device (Sink device) 10 for continuing the operation as the HDMI 2.x is, for example, the process after the reception of the video and audio signal in compliance with HDMI 2.x in S905 in FIG. 9.

When the version of HDMI is HDMI 1.4b (Yes in S1006) as a result of analysis, the video display device (Sink device) 10 switches the operation to an operation as the HDMI 1.4b. The process performed by the video display device (Sink device) 10 for switching the operation to an operation as the HDMI 1.4b is, for example, the process after the reception of the video and audio signal in compliance with HDMI 1.4b in S805 in FIG. 8.

When the video display device (Sink device) 10 determines the version of the HDMI to be operated, the switching process is ended (S1020).

The process flow for switching the version of the operating HDMI in FIG. 10 is performed every time when the video display device (Sink device) 10 recognizes the connection with the new video transmission device (Source device) as a result of detection of the voltage of the 5V power supply line.

In the above description, regarding the version of the HDMI, the upper version is described as HDMI 2.x and the lower version is described as HDMI 1.4b, but the present embodiment is not limited thereto, and the upper version may be HDMI 2.x and the lower version may be HDMI 1.x.

Further, in the above description, the case where the video transmission device 20 transmits the extended InfoFrame in correspondence with the HDMI extended function compatible bit 401 of EDID illustrated in FIG. 4A has been described as an example. However, the present embodiment is not limited thereto.

For example, the communication controller 252 of the video transmission device 20 may transmit the control information corresponding to the HDMI extended function compatible bit 402 to the video display device 10 via a signal on the CEC line or the DDC line corresponding to the HDMI extended function compatible bit 401 of EDID illustrated in FIG. 4A.

In this case, the processes of the video display device 10 and the video transmission device 20 may be replaced with the process of transmitting control information corresponding to the HDMI extended function compatible bit 402 via the signal on the CEC line or the DDC line, for example, in the process (S605) of transmitting the extended InfoFrame of FIG. 6 to the video display device (Sink device) 10.

Furthermore, in the above description, the format of the extended InfoFrame has been described by way of example including the HDMI extended function compatible bit 402 as illustrated in FIG. 4B, but the format of the extended InfoFrame is not limited thereto. The format example of the extended InfoFrame may be a format including a corresponding function in correspondence with the HDMI extended function compatible bit 401 instead of the HDMI extended function compatible bit 402. Specifically, the format example of the extended InfoFrame may include control information indicating a specific function of HDMI 2.x as response information. Alternatively, the format example of the extended InfoFrame may include both of the HDMI extended function compatible bit 402 and control information indicating the corresponding specific function in correspondence with the HDMI extended function compatible bit 401 as the response information.

In this case, the process of the video display device 10 and the video transmission device 20 may be replaced with the process of analyzing the response information, for example, in the process of the determination module 151 of the video display device (Sink device) 10 that has received (S605) the extended InfoFrame in FIG. 6.

Furthermore, in the above description, the process using the HPD line has been described as an example of the process for reconnecting the video display device 10 and the video transmission device 20, but the process is not limited thereto. In order to shorten the reconnection time between the video display device 10 and the video transmission device 20, the fact that the content of EDID set by the communication controller 152 of the video display device 10 has changed due to the signal of the CEC line or the DDC line (EDIE change notification) may be notified, and the video transmission device 20 that has received this notification may transmit EDID transmission request.

In this case, in the processing of the video display device 10 and the video transmission device 20, for example, the video display device 10 transmits EDID change notification to the video transmission device 20 instead of the Hot Plug Detect (HDP) ON process in FIG. 6.

As described above, when the video display device (Sink device) 10 according to the present embodiment is connected to the video transmission device (Source device) 20 of various HDMI versions, the version of HDMI to be operated can be determined according to the value of the HDMI extended function compatible bit included in the extended InfoFrame transmitted from the video transmission device (Source device) 20. Furthermore, when the extended InfoFrame is not transmitted from the video transmission device (Source device) 20, the video display device (Sink device) 10 analyzes the video and audio signal transmitted from the video transmission device (Source device) 20, and according to the analysis result, the version of HDMI to operate can be determined.

By operating in this manner, the video display device (Sink device) 10 can normally display the received video and audio signal on the display 13 and output the received video and audio signal to the speaker 15 even when the video display device (Sink device) 10 is connected to the video transmission device (Source devices) 20 of HDMI versions different from each other, and irrespective of whether the video transmission device (Source device) 20 supports the extended InfoFrame.

When the video display device (Sink device) 10 is connected to the video transmission device (Source device) 20 corresponding to the extended InfoFrame, the version of the HDMI with which the video transmission device (Source device) 20 operates is determined not depending on the received video and audio signal, but depending on the value of the HDMI extended function compatible bit 402 of the received extended InfoFrame. Therefore, the version of HDMI to be operated can be determined accurately as compared with the case where the version of the HDMI with which the video transmission device (Source device) 20 operates is determined by the video and audio signal. It is because, for example, a case where the video transmission device (Source device) 20 compliant with the HDMI 2.x transmits a video and audio signal compliant with the HDMI 1.4b by a user operation is assumed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device to be connected to a separate electronic device in compliance with the High-Definition Multimedia Interface (HDMI) standard, the electronic device comprising:

a memory that stores a first Extended Display Identification Data (EDID) including an identification bit presenting presence or absence of support of HDMI 2.x to the separate electronic device;

a transmitter that transmits the first EDID stored in the memory; and a receiver that receives a signal transmitted from the separate electronic device in response to the first EDID, wherein when the receiver receives first control information including first response information set in response to the identification bit from the separate electronic device, HDMI 2.x is determined as a compliant version of the HDMI, when the receiver receives second control information including second response information set in response to the identification bit from the separate electronic device, HDMI 1.x is determined as the compliant version of the HDMI, and when the receiver receives a video and audio signal from the separate electronic device, the video and audio signal is analyzed, and when a first condition that an HDMI signal rate is 10.2 Gbps or less and a color space is not 4:2:0 format or the video and audio signal is not HDR format and a second condition that a DVI signal is included are not satisfied, HDMI 2.x is determined as the compliant version of the HDMI.

* * * * *